(12) United States Patent
Gadelrab et al.

(10) Patent No.: US 12,212,247 B2
(45) Date of Patent: Jan. 28, 2025

(54) THREE-PHASE LLC CONVERTERS WITH INTEGRATED MAGNETICS

(71) Applicant: VIRGINIA TECH INTELLECTUAL PROPERTIES, INC., Blacksburg, VA (US)

(72) Inventors: Rimon Gadelrab, Blacksburg, VA (US); Fred C. Lee, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 205 days.

(21) Appl. No.: 17/841,954

(22) Filed: Jun. 16, 2022

(65) Prior Publication Data

US 2023/0122794 A1    Apr. 20, 2023

Related U.S. Application Data

(60) Provisional application No. 63/257,699, filed on Oct. 20, 2021.

(51) Int. Cl.
| | |
|---|---|
| *H02M 3/335* | (2006.01) |
| *H01F 27/24* | (2006.01) |
| *H01F 27/28* | (2006.01) |
| *H02M 3/00* | (2006.01) |

(52) U.S. Cl.
CPC ........ *H02M 3/33584* (2013.01); *H01F 27/24* (2013.01); *H01F 27/28* (2013.01); *H02M 3/01* (2021.05)

(58) Field of Classification Search
CPC .... H02M 3/335; H02M 3/33584; H02M 3/01; H01F 27/24; H01F 27/28
See application file for complete search history.

(56) References Cited

U.S. PATENT DOCUMENTS

| | | | |
|---|---|---|---|
| 9,240,723 B2 * | 1/2016 | Boysen | H02M 3/24 |
| 9,780,678 B2 | 10/2017 | Adragna et al. | |
| 10,381,938 B2 * | 8/2019 | Zhang | H02M 3/33576 |
| 10,804,812 B1 * | 10/2020 | Dehem | H02M 3/33571 |
| 10,873,265 B2 | 12/2020 | Xue et al. | |

(Continued)

FOREIGN PATENT DOCUMENTS

| | | |
|---|---|---|
| CN | 102223091 A | 10/2011 |
| CN | 101944852 B | 3/2013 |
| CN | 102403907 B | 12/2014 |

OTHER PUBLICATIONS

Gadelrab, Rimon, et al. "LLC Resonant Converter with 99% Efficiency for Data Center Server." 2021 IEEE Applied Power Electronics Conference and Exposition (APEC). IEEE, Sep. 2021.

(Continued)

*Primary Examiner* — Adolf D Berhane
(74) *Attorney, Agent, or Firm* — Thomas | Horstemeyer, LLP

(57) ABSTRACT

Three-phase interleaved resonant converters with integrated magnetics are described. In various examples, transformers are integrated into a transformer core of a converter. A primary side circuit includes a set of circuit segments corresponding to phases of the three-phase interleaved converter. Each of the circuit segments include an integrated winding component that provides a transformer primary winding and a resonant inductor connected in series.

20 Claims, 8 Drawing Sheets

(56) References Cited

U.S. PATENT DOCUMENTS

| | | | |
|---|---|---|---|
| 11,671,030 B2 * | 6/2023 | Tian | H02M 7/23 363/37 |
| 2010/0328968 A1 | 12/2010 | Adragna et al. | |
| 2016/0254756 A1 | 9/2016 | Yang et al. | |

OTHER PUBLICATIONS

Nabih, Ahmed, et al. "High power density 1 MHz 3 KW 400 V-48 V LLC converter for datacenters with improved core loss and termination loss." 2021 IEEE Applied Power Electronics Conference and Exposition (APEC). IEEE, Oct. 2021.

Orietti, Enrico, et al. "Current sharing in three-phase LLC interleaved resonant converter." IEEE Energy Conversion Congress and Exposition. IEEE, Oct. 2009.

Huawei, R4850S1—The Leading Efficiency Rectifier in the Industry, Aug. 2016.

\* cited by examiner

THREE-PHASE LLC CONVERTERS WITH INTEGRATED MAGNETICS

CROSS REFERENCE TO RELATED APPLICATIONS

This application claims priority to and the benefit of U.S. Provisional Application No. 63/257,699, filed on Oct. 20, 2021 and entitled "THREE-PHASE LLC CONVERTERS WITH INTEGRATED MAGNETICS," which is hereby incorporated herein by reference in its entirety.

BACKGROUND

Power converters can convert power or energy in various ways. For example, alternating current (AC) can be converted to direct current (DC), DC can be converted to AC, AC can be converted to AC, DC can be converted to DC, and so on. Converting AC to AC can include an AC to DC conversion and a DC to AC conversion. DC to DC conversion can include converting DC to AC and AC to DC. Other conversions can also be included that can change voltage levels, current levels, and other conversions. In that context, a power converter can include a device for converting electrical energy. A transformer is one example of a power converter, although more complicated systems, including complex arrangements of diodes, synchronous rectifiers, switching transistors, transformers, and control loops, can be used.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1:
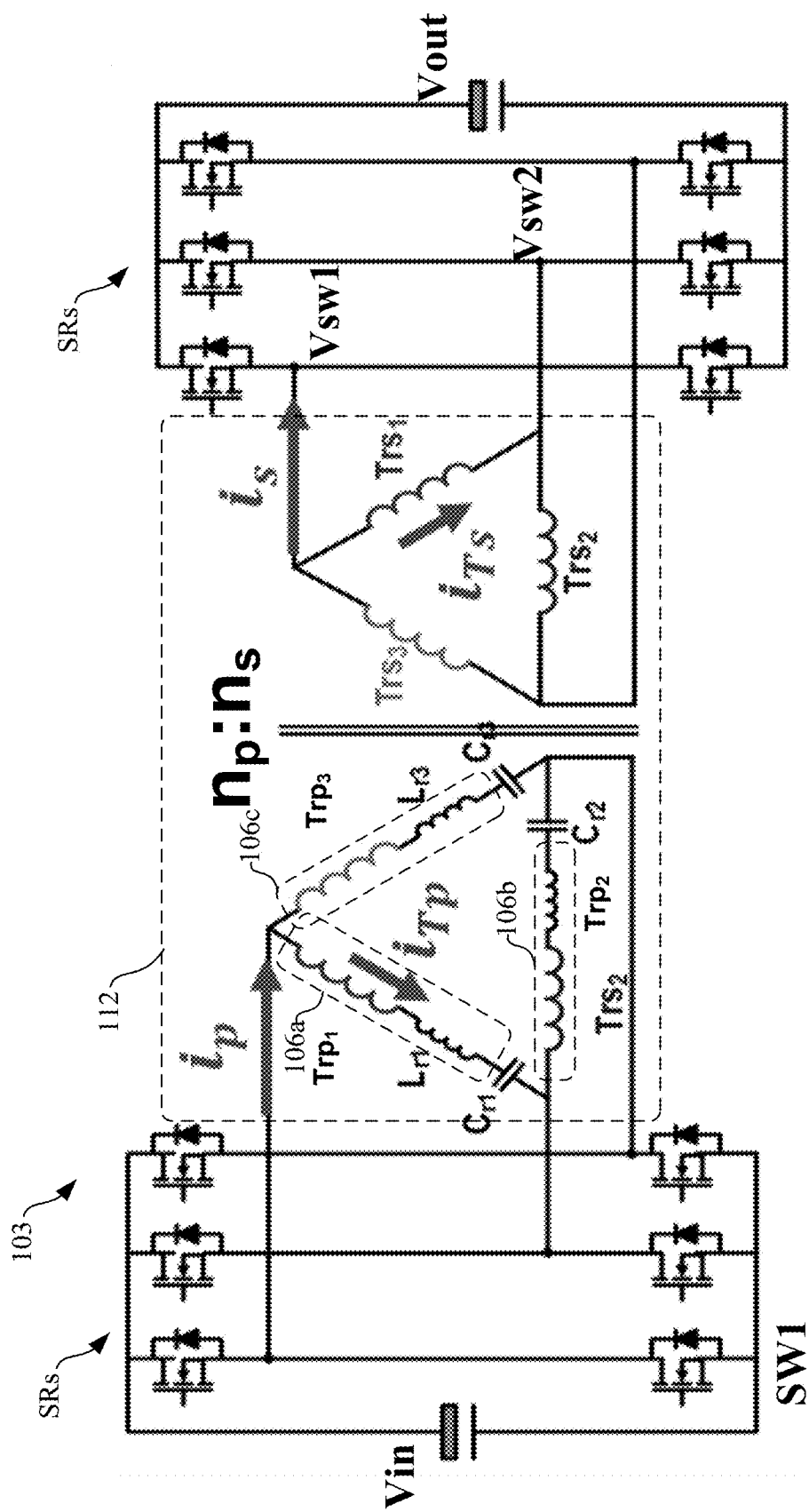
FIG. 1 shows a three-phase interleaved converter with series integrated resonant inductors and transformer windings, according to various embodiments described herein.

Power conversion is related to converting alternating current (AC) to direct current (DC), DC to AC, AC to AC, DC to DC, and so on. Any of these conversions can include intermediate conversions. For example, an AC to AC conversion can include an AC to DC conversion and a DC to AC conversion. DC to DC conversion can include converting DC to AC and AC to DC. Other conversions can also be included that can change voltage levels, current levels, and other conversions. In that context, a power converter can include a device for converting electrical energy. A transformer is one example of a power converter, although more complicated systems, including complex arrangements of diodes, synchronous rectifiers, switching transistors, transformers, and control loops, can be used.

Some aspects of the present disclosure include LLC converters, and CLLC converters. These converters can be utilized from low-voltage-low-power to high-voltage-high-power applications. For server and telecom applications, LLC converters can be used for 400/48V and 48/1V power supplies, among other voltages. The described LLC converters can also be used for battery charging technology. In Electric Vehicle (EV) applications, the LLC converters can be used in both onboard charging elements and part of a charging station. In the renewable energy industry, the LLC converters can also be used in a photovoltaic (PV) system. A single-phase approach for LLC DC/DC converters has the limitation of power conversion capability due to current stress on the components. Existing decoupled three-phase LLC converters can result in a current sharing issue due to the tolerance of passive components.

As described herein, three-phase interleaved LLC and CLLC resonant converters with integrated magnetic structures can provide advancement over existing technologies. In various embodiments, the primary side of the LLC converter can be delta-connected to reduce the RMS currents and hence minimize the winding loss, furthermore it eliminates the DC bias in the resonant capacitor. The secondary side can be delta-connected to reduce the RMS currents and hence minimize the winding loss. However, one or more of the primary and secondary sides can alternatively be wye-connected. In some of the proposed magnetic structures, the transformers for the three phases can be integrated into one magnetic core with one leg per transformer and edge legs that reduce core loss. For example, six inductors (inductances) and six transformers can be integrated into a magnetic core with six legs, for a circuit with two transformers per phase. Any number of transformers can be used per phase, so a number of transformers used can be any multiple of 3. The number of inductances can match the number of transformers, as leakage inductance of each transformer can be used as a resonant inductance. Resonant inductance (leakage) can be controlled using air gaps between each leg and the top (or bottom) portion of the magnetic core.

In some proposed magnetic structures, three inductors and three transformers can be integrated into one magnetic core with six core legs, and the resonant inductance and magnetizing inductance can be controlled independently. The resonant inductance and magnetizing inductance can be controlled by adjusting the air gaps, and the ratio between them can be changed by changing the primary and secondary winding distribution. A primary side winding can be wrapped around two of the core legs, and a secondary side winding can be wrapped around one of the core legs; the portion of the primary side winding that is looped around the same core leg as the secondary can provide transformer magnetizing inductance, while the portion of the primary side winding that is around the other core leg can control the resonant inductance. Multi-layer (e.g., four-layer) PCB windings can be employed, and circuit components such as synchronous rectifiers and capacitors can be integrated into the winding area.

FIG. 1 shows an example of a three-phase interleaved converter 103 with series integrated components 106a, 106b, 106c (the integrated components 106) that each embody both a resonant inductor and a transformer winding. In this example, each of the integrated components 106 can be included on a primary side of the delta-delta connected LLC three-phase interleaved converter 103.

The integrated component 106a can include a transformer winding $Trp_1$ and a resonant inductor $Lr_1$. The integrated component 106b can include a transformer winding $Trp_2$ and a resonant inductor $Lr_2$. The integrated component 106c can include a transformer winding $Trp_3$ and a resonant inductor $Lr_3$.

In the specific topology of the three-phase interleaved converter 103 shown, the integrated component 106a can be in series with a resonant capacitor $Cr_1$. The integrated component 106b can be in series with a resonant capacitor $Cr_2$. The integrated component 106c can be in series with a resonant capacitor $Cr_3$. The primary side of the three-phase interleaved converter 103 can be delta connected, with each phase/leg of the primary delta circuit including a series-connected integrated component 106 and a resonant capacitor.

A three-phase interleaved converter topology 112 of the three-phase interleaved converter 103 can incorporate the integrated component 106a, the integrated component 106b, and the integrated component 106b, as well as the corresponding transformer secondaries $Trs_1$, $Trs_2$, $Trs_3$. In some examples, the resonant capacitors $Cr_1$, $Cr_2$, $Cr_3$ can be integrated by including all or a portion of the capacitor footprint within a winding area of the magnetic core for the converter. In other examples, the resonant capacitors $Cr_1$, $Cr_2$, $Cr_3$ can be completely outside a separate area outside of the winding area. In some examples, the connector solder pads can be within a winding area of the three-phase interleaved converter topology 112. The resonant capacitors $Cr_1$, $Cr_2$, $Cr_3$ can be connected by printed circuit board (PCB) traces and other types of wiring. The three-phase interleaved converter topology 112 can also be referred to as a magnetically integrated three-phase interleaved converter topology, since the integrated components 106 are magnetically integrated into a single component, and the resonant capacitors $Cr_1$, $Cr_2$, $Cr_3$ can be integrated into the winding area.

The secondary side of the three-phase interleaved converter 103 can also be delta connected, with each phase/leg of the secondary delta circuit including and/or being limited to a transformer secondary $Trs_1$, $Trs_2$, $Trs_3$. A resonant frequency of the three-phase interleaved converter 103 circuit can be selected by changing the capacitance of the resonant capacitors and resonant inductors. In some examples, each of the resonant capacitors $Cr_1$, $Cr_2$, $Cr_3$ can have a same value as each other. Each of the resonant inductors $Lr_1$, $Lr_2$, $Lr_3$ can have a same value as each other. While the resonant inductor and transformer elements of each integrated component 106 can be modeled as separate elements in a circuit diagram, the elements can physically be both part of a single coil-type integrated component 106.

For delta-connections, the transformer winding currents $i_{Tp}$, $i_{Ts}$ can be smaller than the line currents $i_p$, $i_s$. This can be true for each of the phases of the three-phase interleaved converter 103. The transformer winding currents $i_{Tp}$, $i_{Ts}$ can be calculated using equation set (1):

$$i_{Tp} = \frac{i_p}{\sqrt{3}}, i_{Ts} = \frac{i_s}{\sqrt{3}} \tag{1}$$

On the other hand, wye connections can have $i_{Tp}$ equal to $i_p$. As a result, the delta-connection can be utilized for embodiments where reducing the root mean square (RMS) currents in each phase leg circuit segment is preferable. The three-phase interleaved converter 103 can also include a half bridge circuit of synchronous rectifiers that connects each primary-side phase to Vin. In other embodiments a full bridge circuit of synchronous rectifiers can be used. A half bridge circuit can also be used to connect each secondary-side phase to Vout. In other embodiments a full bridge can be used. The delta connection can have a larger volt-second than a wye connection, and can use a larger core comparatively, since core flux can be a limiting factor.

Figure 2:
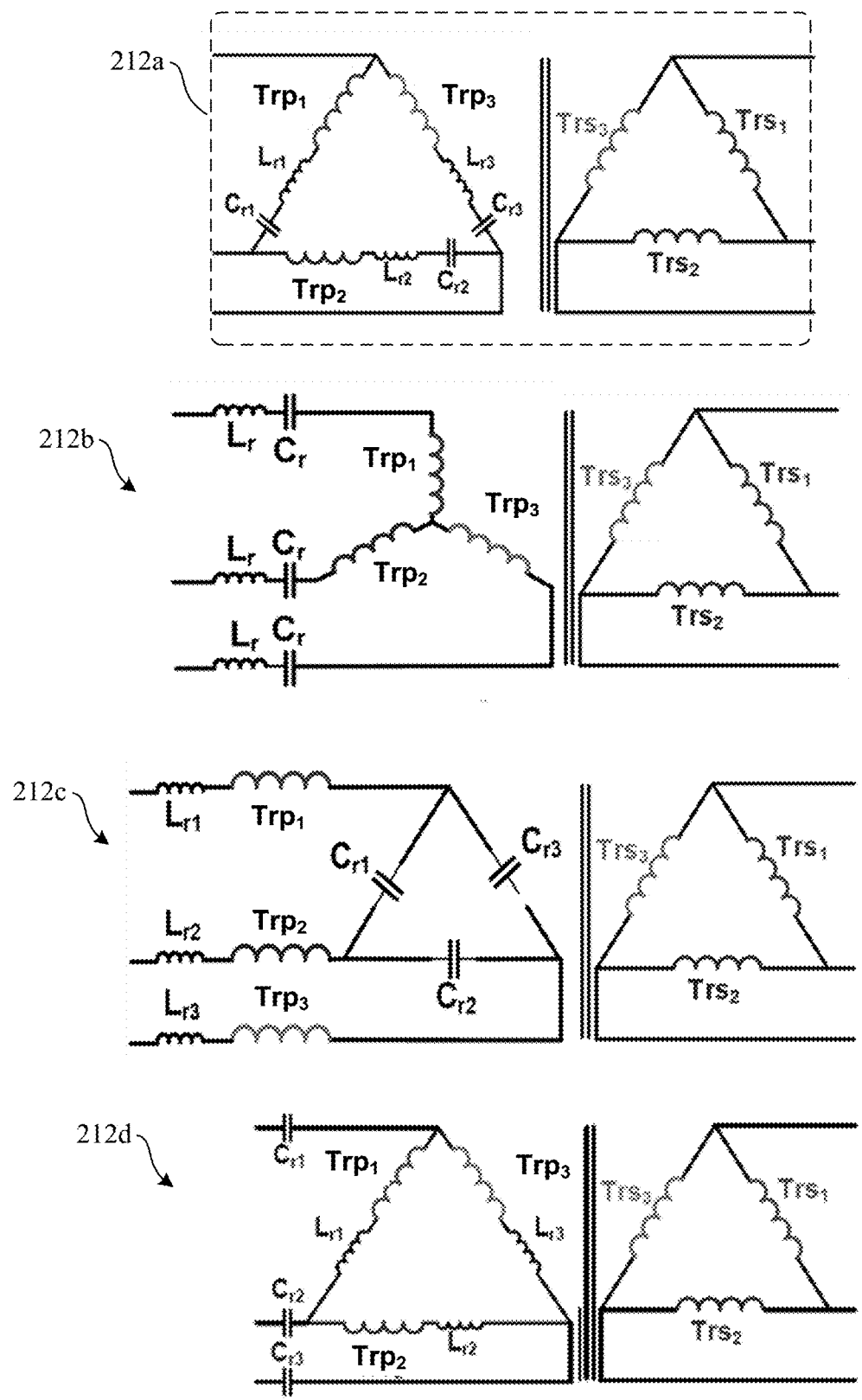
FIG. 2 shows examples of three-phase interleaved converters with series integrated resonant inductors and transformer windings with delta-arranged secondary winding circuits, according to various embodiments described herein.

FIG. 2 shows a number of examples of three-phase interleaved converter topologies 212a, 212b, 212c, 212d (the three-phase interleaved converter topologies 212) for various three-phase interleaved converters 103. The three-phase interleaved converter topologies 212 can include series integrated resonant inductors and transformer windings and delta-connected secondary windings.

In other words, in each of the three-phase interleaved converter topologies 212, $Trp_1$ and $Lr_1$ can be formed as a single integrated component. This is possible because these topologies are designed with $Trp_1$ and $Lr_1$ in series. The series relationship between these components allows leakage inductance of phase one of the transformer to be dominated and absorbed into the system as resonant inductor $Lr_1$. Likewise, in each of the three-phase interleaved converter topologies 212, $Trp_2$ and $Lr_2$ can be formed as a single integrated component. $Trp_3$ and $Lr_3$ can also be formed as a single integrated component in each of the three-phase interleaved converter topologies 212.

The three-phase interleaved converter topology 212a can correspond to the three-phase interleaved converter topology 112 of FIG. 1. The three-phase interleaved converter topology 212a shows a delta primary configuration with a first phase leg circuit segment that includes $Trp_1$, $Lr_1$, and $Cr_1$ in series, a second phase leg circuit segment that includes $Trp_2$, $Lr_2$, and $Cr_2$ in series, and a third phase leg circuit segment that includes $Trp_3$, $Lr_3$, and $Cr_3$ in series. The three-phase interleaved converter topology 212a can be described as having a delta-connected primary with each phase leg circuit segment of the delta arrangement including a primary transformer winding, resonant inductor, and resonant capacitor in series. The three-phase interleaved converter topology 212a can be described as having a delta-connected secondary with each of the phase leg circuit segments including one of the secondary transformer windings $Trs_1$, $Trs_2$, $Trs_3$.

The three-phase interleaved converter topology 212b shows a wye primary configuration with a first phase leg circuit segment that includes $Trp_1$, $Lr_1$, and $Cr_1$ in series, a second phase leg circuit segment that includes $Trp_2$, $Lr_2$, and $Cr_2$ in series, and a third phase leg circuit segment that includes $Trp_3$, $Lr_3$, and $Cr_3$ in series. The three-phase interleaved converter topology 212b can be described as having a wye-connected primary with each phase leg circuit segment in the wye arrangement including a primary transformer winding, resonant inductor, and resonant capacitor in series. The three-phase interleaved converter topology 212b can be described as having a delta-connected secondary with each of the phase leg circuit segments including one of the secondary transformer windings $Trs_1$, $Trs_2$, $Trs_3$.

The three-phase interleaved converter topology 212c can be described as having a wye topology (or mixed wye-delta topology). A first phase leg circuit segment of the wye configuration includes $Lr_1$ and $Trp_1$ in series as a magnetically integrated component, a second phase leg circuit segment of the wye configuration includes $Lr_2$ and $Trp_2$ in series as a magnetically integrated component, a third phase leg circuit segment of the wye configuration includes $Lr_3$ and $Trp_3$ in series as a magnetically integrated component. The resonant capacitors $Cr_1$, $Cr_2$, and $Cr_3$, are arranged in a delta at the center of the wye, with each phase leg circuit segment connecting from one of the three nodes of the delta to a half bridge or full bridge circuit. Each phase leg circuit segment can include a transformer winding and resonant inductor as a magnetically integrated component. Since the transformer primaries are connected in a wye formation, the three-phase interleaved converter topology 212c can be considered a wye primary topology. The three-phase interleaved converter topology 212c can be described as having a delta-connected secondary with each of the phase leg circuit segments including one of the secondary transformer windings $Trs_1$, $Trs_2$, $Trs_3$.

The three-phase interleaved converter topology 212d can be described as having a delta topology (or mixed delta-wye topology). A first phase leg circuit segment of the delta configuration includes $Lr_1$ and $Trp_1$ in series as a magnetically integrated component, a second phase leg circuit segment of the delta configuration includes $Lr_2$ and $Trp_2$ in series as a magnetically integrated component, a third phase leg circuit segment of the delta configuration includes $Lr_3$ and $Trp_3$ in series as a magnetically integrated component. The resonant capacitors $Cr_1$, $Cr_2$, and $Cr_3$, are arranged in a wye, each connecting from one of the three nodes of the delta to a half bridge or full bridge circuit. Since the transformer primaries are connected in a delta formation, the three-phase interleaved converter topology 212d can be considered a delta primary topology. The three-phase interleaved converter topology 212d can be described as having a delta-connected secondary with each of the phase leg circuit segments including one of the secondary transformer windings $Trs_1$, $Trs_2$, $Trs_3$.

Figure 3:
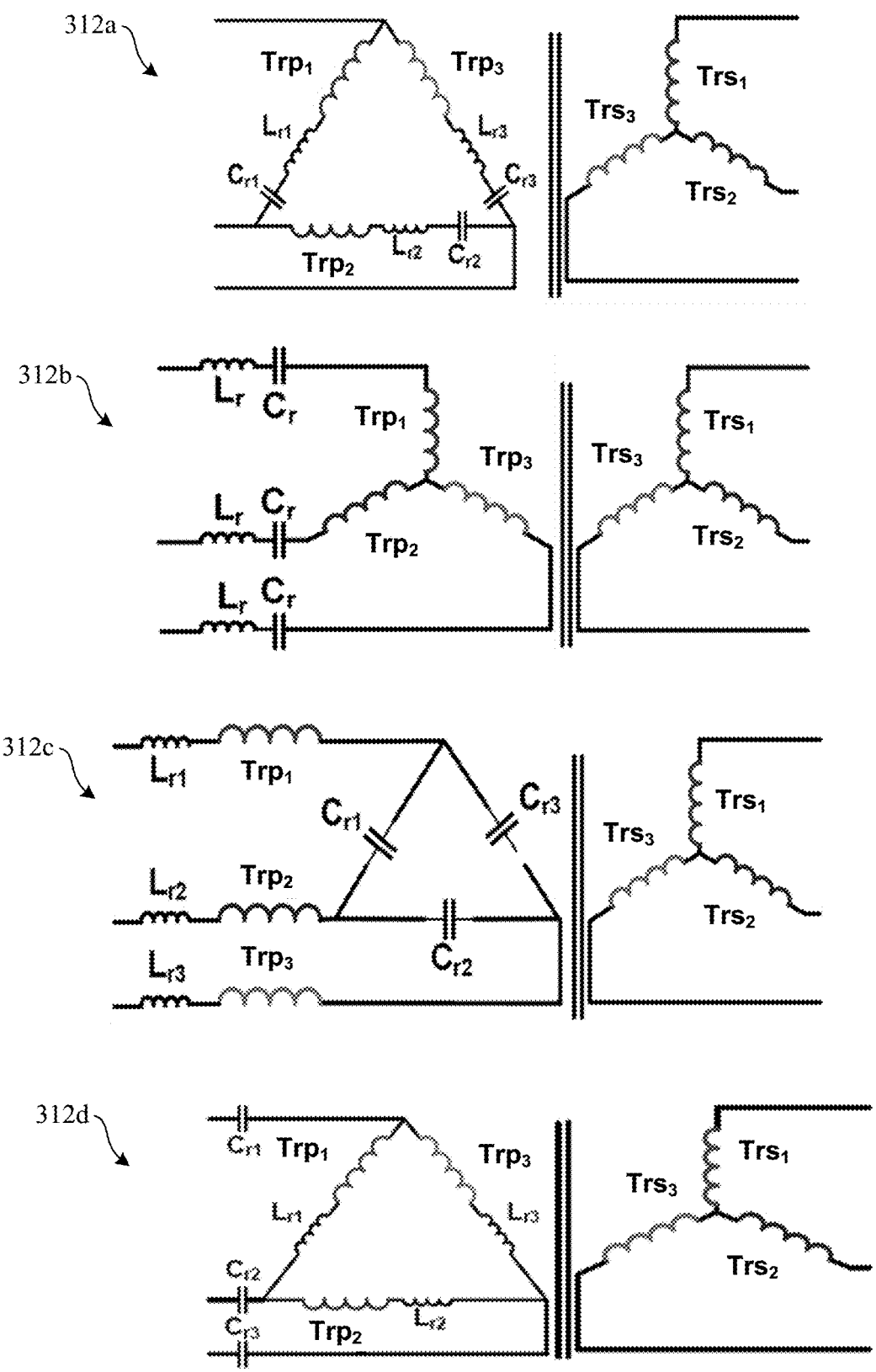
FIG. 3 shows examples of three-phase interleaved converters with series integrated resonant inductors and transformer windings with wye-arranged secondary winding circuits, according to various embodiments described herein.

FIG. 3 shows a number of examples of three-phase interleaved converter topologies 312a, 312b, 312c, 312d (the three-phase interleaved converter topologies 312) for various three-phase interleaved converters 103. The three-phase interleaved converter topologies 312 can include series integrated resonant inductors and transformer windings and wye-connected secondary windings.

In other words, in each of the three-phase interleaved converter topologies 312, $Trp_1$ and $Lr_1$ can be formed as a single integrated component. This is possible because these topologies are designed with $Trp_1$ and $Lr_1$ in series. The series relationship between these components allows leakage inductance of phase one of the transformer to be dominated and absorbed into the system as resonant inductor $Lr_1$. Likewise, in each of the three-phase interleaved converter topologies 312, $Trp_2$ and $Lr_2$ can be formed as a single integrated component. $Trp_3$ and $Lr_3$ can also be formed as a single integrated component in each of the three-phase interleaved converter topologies 312.

The three-phase interleaved converter topology 312a shows a delta primary configuration with a first phase leg circuit segment that includes $Trp_1$, $Lr_1$, and $Cr_1$ in series, a second phase leg circuit segment that includes $Trp_2$, $Lr_2$, and $Cr_2$ in series, and a third phase leg circuit segment that includes $Trp_3$, $Lr_3$, and $Cr_3$ in series. The three-phase interleaved converter topology 312a can be described as having a delta-connected primary with each phase leg circuit segment of the delta arrangement including a primary transformer winding, resonant inductor, and resonant capacitor in series. The three-phase interleaved converter topology 312a can be described as having a wye-connected secondary with each of the phase leg circuit segments including one of the secondary transformer windings $Trs_1$, $Trs_2$, $Trs_3$.

The three-phase interleaved converter topology 312b shows a wye primary configuration with a first phase leg circuit segment that includes $Trp_1$, $Lr_1$, and $Cr_1$ in series, a second phase leg circuit segment that includes $Trp_2$, $Lr_2$, and $Cr_2$ in series, and a third phase leg circuit segment that includes $Trp_3$, $Lr_3$, and $Cr_3$ in series. The three-phase interleaved converter topology 312b can be described as having a wye-connected primary with each phase leg circuit segment in the wye arrangement including a primary transformer winding, resonant inductor, and resonant capacitor in series. The three-phase interleaved converter topology 312b can be described as having a wye-connected secondary with each of the phase leg circuit segments including one of the secondary transformer windings $Trs_1$, $Trs_2$, $Trs_3$.

The three-phase interleaved converter topology 312c can be described as having a wye topology (or mixed wye-delta topology). A first phase leg circuit segment of the wye configuration includes $Lr_1$ and $Trp_1$ in series as a magnetically integrated component, a second phase leg circuit segment of the wye configuration includes $Lr_2$ and $Trp_2$ in series as a magnetically integrated component, a third phase leg circuit segment of the wye configuration includes $Lr_3$ and $Trp_3$ in series as a magnetically integrated component. The resonant capacitors $Cr_1$, $Cr_2$, and $Cr_3$, are arranged in a delta at the center of the wye, with each phase leg circuit segment connecting from one of the three nodes of the delta to a half bridge or full bridge circuit. Each phase leg circuit segment can include a transformer winding and resonant inductor as a magnetically integrated component. Since the transformer primaries are connected in a wye formation, the three-phase interleaved converter topology 312c can be considered a wye primary topology. The three-phase interleaved converter topology 312c can be described as having a wye-connected secondary with each of the phase leg circuit segments including one of the secondary transformer windings $Trs_1$, $Trs_2$, $Trs_3$.

The three-phase interleaved converter topology 312d can be described as having a delta topology (or mixed delta-wye topology). A first phase leg circuit segment of the delta configuration includes $Lr_1$ and $Trp_1$ in series as a magnetically integrated component, a second phase leg circuit segment of the delta configuration includes $Lr_2$ and $Trp_2$ in series as a magnetically integrated component, a third phase leg circuit segment of the delta configuration includes $Lr_3$ and $Trp_3$ in series as a magnetically integrated component. The resonant capacitors $Cr_1$, $Cr_2$, and $Cr_3$, are arranged in a wye, each connecting from one of the three nodes of the delta to a half bridge or full bridge circuit. Since the transformer primaries are connected in a delta formation, the three-phase interleaved converter topology 312d can be considered a delta primary topology. The three-phase interleaved converter topology 312d can be described as having a wye-connected secondary with each of the phase leg circuit segments including one of the secondary transformer windings $Trs_1$, $Trs_2$, $Trs_3$.

Figure 4:
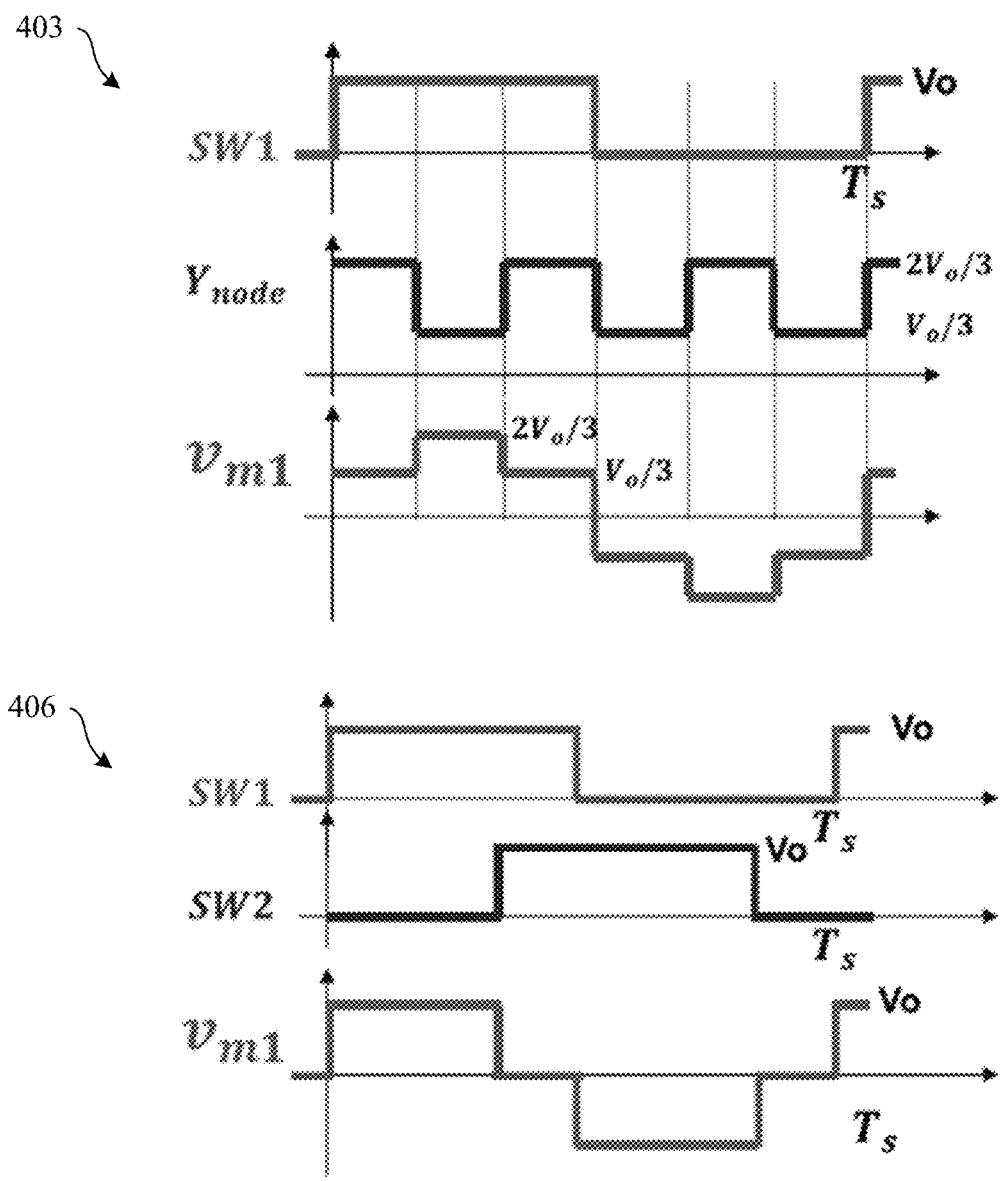
FIG. 4 shows example switching cycles of three-phase interleaved converters with series integrated resonant inductors and transformer windings, according to various embodiments described herein.

FIG. 4 shows a wye-secondary switching cycle 403 and a delta-secondary switching cycle 406. In various embodiments, the wye-secondary switching cycle 403 can be used for three-phase interleaved converters 103 that include a wye-connected secondary. The delta-secondary switching cycle 406 can be used for three-phase interleaved converters 103 that include a delta-connected secondary.

For three-phase interleaved converters 103 that include a wye configuration, the transformer voltage excitation $v_{m1}$ can be the difference between the switching node voltage $v_{SW1}$ and Y-node voltage $v_{Y\text{-}node}$ as described by equation 2.

$$v_{m1} = v_{SW1} - v_{Y\text{-}node} \quad (2)$$

The Y connection transformer volt-second can be calculated using equation 3:

$$\text{Volt} - \text{second}(Y - \text{connection}) = \frac{2}{9} V_o T_s \quad (3)$$

For the three-phase interleaved converters 103 that include a delta connection, the transformer excitation voltage can be the difference between two switching node voltages as described in equation 4:

$$v_{m1} = v_{SW1} - v_{SW2} \quad (4)$$

The transformer volt-second can be calculated using equation 5:

$$\text{Volt} - \text{second}(\Delta - \text{connection}) = \frac{1}{3} V_o T_s \quad (5)$$

As can be seen, the Y-connected secondary can reduce the transformer's volt-second by 33% compared to the Δ-connected secondary.

Figure 5A:
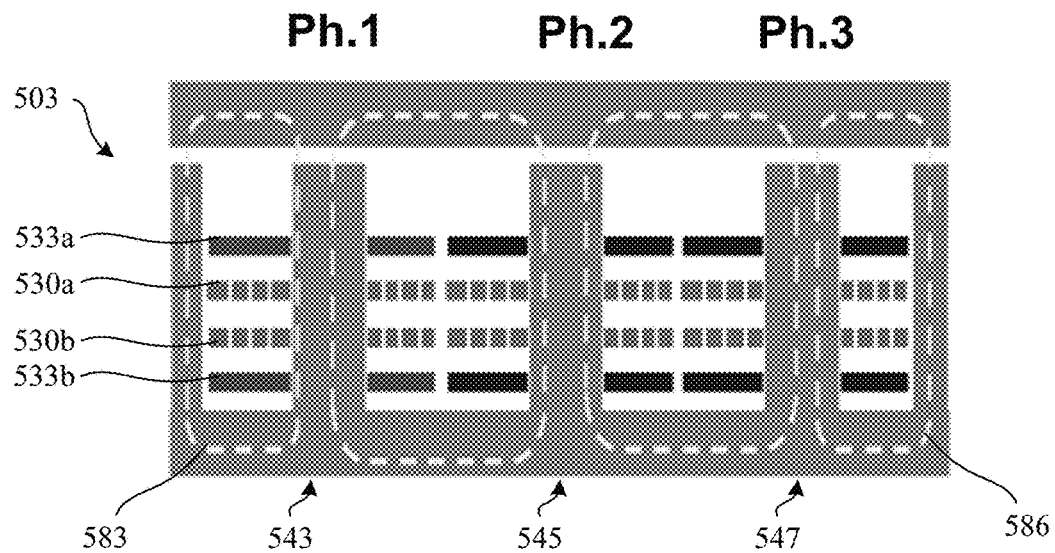
FIG. 5A shows an example of a magnetic core and printed circuit board design for magnetic integration of a three-phase interleaved converter with series integrated resonant inductors and transformer windings, according to various embodiments described herein.
Figure 5A:
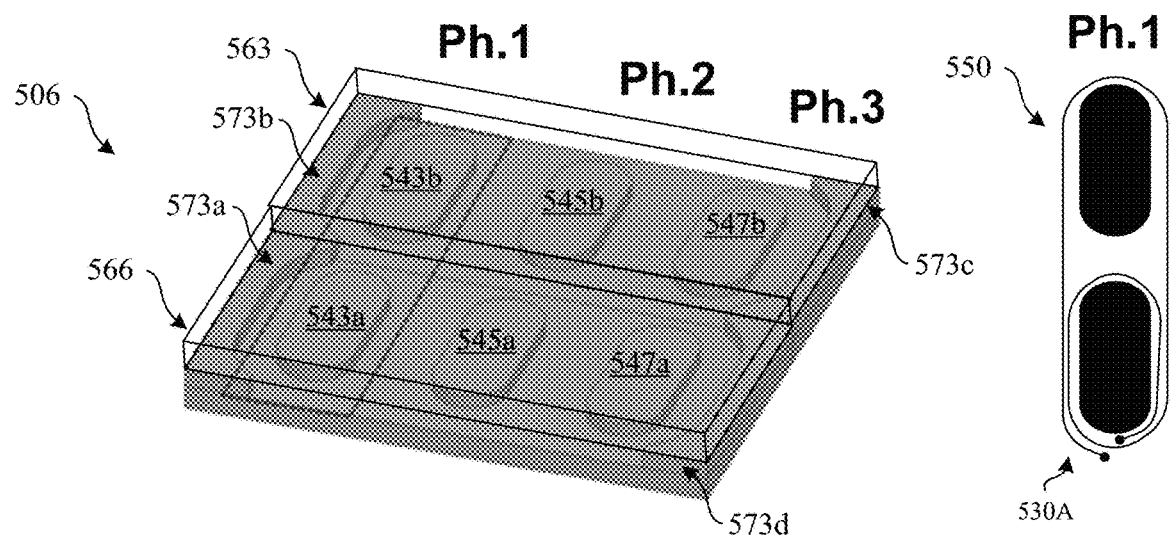

FIG. 5A shows a side view of a printed circuit board topology 503 and an isometric view of a core topology 506. The principles described with respect to the various topologies can be combined with one another and can be used for the various three-phase interleaved converters 103.

The printed circuit board topology 503 includes phase one primary windings 530a and 530b, as well as phase one secondary windings 533a and 533b. The windings 530a, 530b, 533a, and 533b can be metal or otherwise conductive printed circuit board (PCB) traces on a PCB. The phase one primary winding 530a can be on a separate layer from phase one primary winding 530b, which can be separated by an insulative or non-conductive material. Likewise, the phase one primary winding 530b can be separated from the phase one primary winding 530C using an insulative or non-conductive layer, and so on. While four layers are shown, any number of layers can be used in order to provide a desired number of primary turns and secondary turns, as well as an appropriate size PCB trace or another type of winding.

As can be seen in the isometric view of the core topology 506, phase one winding legs 543a and 543b (the phase one winding legs 543) can be used for phase one of a three-phase interleaved converter 103. Phase two winding legs 545a and 545b (phase two winding legs 545) can be used for phase two of a three-phase interleaved converter 103. Phase three winding legs 547a and 547b (phase three winding legs 547) can be used for phase three of a three-phase interleaved converter 103.

An example winding drawing 550 shows that the phase one primary winding 530a can wrap around one or more of the phase one winding legs 543a and 543b. In the example shown, a first turn of the phase one primary winding 530a can wrap around the phase one winding leg 543a alone, while a second turn of the phase one primary winding 530a can wrap around both the phase one winding legs 543a and 543b. Alternatively, all of the turns and PCB traces of the phase one primary winding 530a can wrap around the phase one winding leg 543a alone. Alternatively, all of the turns and PCB traces of the phase one primary winding 530a can wrap around both the phase one winding legs 543a and 543b. Likewise, the phase one primary winding 530b can wrap around one or more of the phase one winding legs 543a and 543b in any of the manners described for the phase one primary winding 530a. On the other hand, the phase one secondary winding 533a can wrap around the phase one winding leg 543a alone.

Winding legs 543a, 545a, and 547a can be referred to as transformer legs, while winding legs 543b, 545b, and 547b can be referred to as resonant inductor tuning legs. Transformer magnetizing inductances ($L_m$) can be controlled based on the cross-sectional areas $A_m$ of the transformer legs and the transformer leg air gaps $g_m$ according to equation 6.

$$L_m = A_m / g_m \quad (6)$$

On the other hand, the resonant inductances ($L_r$) can be controlled based on the cross-sectional areas $A_r$ of the resonant inductor tuning legs and the resonant inductor tuning leg air gaps $g_r$ according to equation 7.

$$L_r = A_r / g_r \quad (7)$$

The ratio between transformer magnetizing inductances and resonant inductances can be further controlled by adjusting distribution of the primary windings and secondary windings. Specifically, a secondary winding can wrap around a transformer leg; while the corresponding primary winding can wrap around the same transformer leg, at least a portion of the primary winding can wrap around the transformer leg and a resonant inductor tuning leg. Increasing a number of turns of the primary winding around the resonant inductor tuning leg can increase resonant inductance $L_r$ and therefore reduce a ratio $L_N$ of transformer magnetizing inductances $L_m$ to $L_r$.

The core topology 506 can be used for a magnetic structure with controllable leakage inductance, with three transformers integrated into one magnetic core with six core legs. The double-leg design can be used to control the resonant inductance and magnetizing inductance independently. The resonant inductance and magnetizing inductance can be controlled by adjusting the air gap for each winding leg and the "I" portion of the E-I shaped core. The ratio between resonant inductance and magnetizing inductance can be controlled by adjusting the primary and secondary winding distribution.

The resonant inductor tuning leg air gaps $g_r$ can be controlled by altering a height of a core plate 563 that $i_s$ over the resonant inductor tuning legs 543b, 545b, and 547b. The resonant inductor tuning leg air gaps $g_r$ can be controlled by altering a height of the resonant inductor tuning legs 543b, 545b, and 547b. The transformer leg air gaps $g_m$ can be controlled by altering a height of a core plate 566 that is over the transformer legs 543a, 545a, and 547a. The transformer leg air gaps $g_m$ can be controlled by altering a height of the transformer legs 543a, 545a, and 547a.

The core topology 506 can also improve flux distribution over previous technologies by adding the edge core legs 573a, 573b, 573c, and 573d, which omit or exclude any windings, but instead provide additional edge flux paths that are outside of the winding legs. The shape of the edge core legs 573a, 573b, 573c, and 573d can be tailored to match an external periphery of the windings. The addition of edge core legs 573a and 573b can distribute flux more evenly in the core by enabling the flux path 583, thereby reducing flux density in the phase one area during phase one operation of the three-phase interleaved converters 103 compared to previous technologies. The addition of edge core legs 573c and 573d can distribute flux more evenly in the core by enabling the flux path 586, thereby reducing flux density in the phase three area during the phase three operation of the three-phase interleaved converters 103 compared to previous technologies. The edge core legs 573 can have an air gap or can lack an air gap. In examples where the edge core legs 573 lack an air gap, the length of the edge core legs 573 can be longer than the winding legs to provide the air gap for the winding legs. The edge core legs 573 can also provide structural stability.

In a further embodiment, the same core topology 506 can be used with a different winding and electrical component topology to enable two series-connected transformers per phase. In that embodiment, the primary and secondary windings for each transformer can be on a single leg. In other words, a first set of primary and secondary windings for a first phase one transformer can be on winding leg 543a, and a second set of primary and secondary windings for a second phase one transformer can be on winding leg 543b. A first set of primary and secondary windings for a first phase two transformer can be on winding leg 545a, and a second set of primary and secondary windings for a second phase two transformer can be on winding leg 545b. A first set of primary and secondary windings for a first phase three transformer can be on winding leg 547a, and a second set of primary and secondary windings for a second phase three transformer can be on winding leg 547b. The transformers can be connected in series. Each of the winding legs 543a, 543b, 545a, 545b, 547a, 547b can include a primary winding and a secondary winding for a corresponding transformer. While this configuration lacks the finely tuned tuning resonant inductance and magnetizing inductance, the leakage inductance of the transformer winding can nevertheless be used for the resonant inductance. The leakage inductance can be affected by the air gap for each winding leg.

Figure 5B:
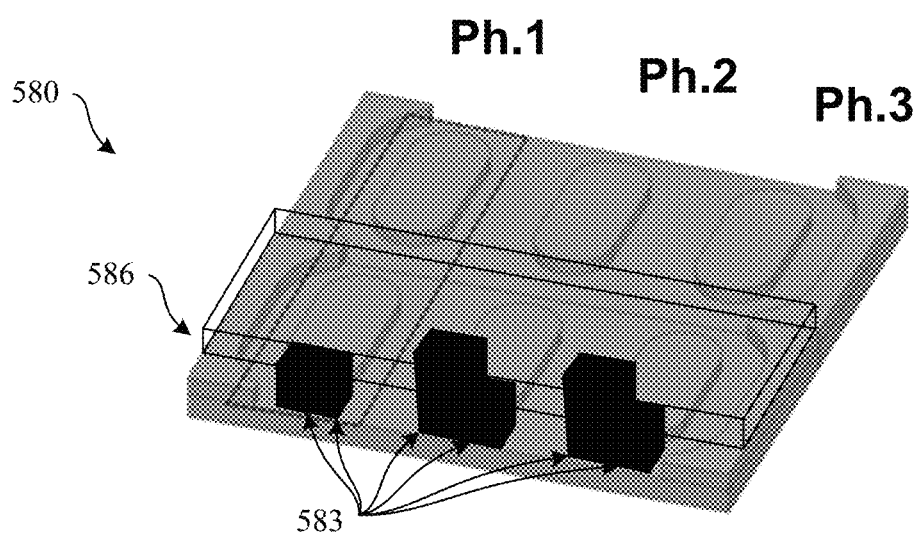
FIG. 5B shows another example of a magnetic core design for magnetic integration of a three-phase interleaved converter with series integrated resonant inductors and transformer windings, according to various embodiments described herein

FIG. 5B shows an isometric view of a core topology 580. The principles described with respect to the various topologies can be combined with one another and can be used for the various three-phase interleaved converters 103. The core topology 580 shows that synchronous rectifiers, resonant capacitors, output capacitors, and other circuit components 583 can be integrated into the footprint of the magnetic core of a three-phase interleaved converter 103. Integrating the circuit components 583 into the winding area or otherwise in the footprint of the magnetic core can reduce termination loss, reduce the current path length, and reduce the overall circuit footprint for the various three-phase interleaved converters 103. In some examples, a top (or bottom) plate section 586 of the magnetic core can be shorter in width than an opposite plate section of the magnetic core, providing space for the circuit components 583 to sit in the winding area or otherwise in the footprint of the magnetic core. For example, one side or edge of the plate section 586 can end at an edge of the winding leg, so that the windings around the winding leg extend beyond that plate section 586 of the magnetic core. In further examples, the both the top plate section 586 and the bottom plate section can end at an edge of the winding leg. In that case, the windings can extend beyond the footprint of the magnetic core, and the circuit components 583 can be outside the footprint of the magnetic core. However, the circuit components 583 are still integrated into the portion of the winding area that extends beyond the core footprint.

Figure 6:
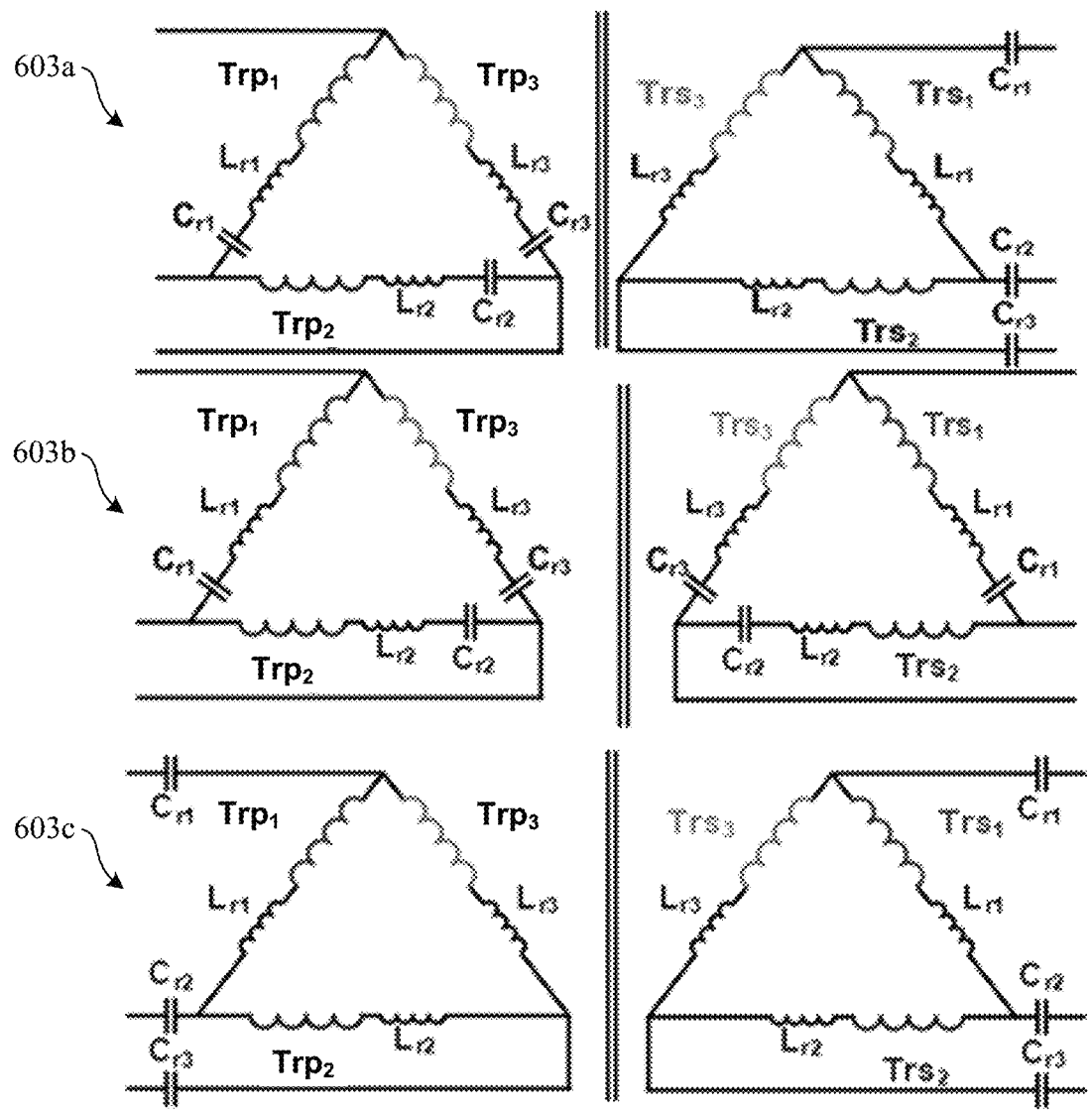
FIG. 6 shows examples of bidirectional three-phase interleaved topologies, according to various embodiments described herein.

FIG. 6 shows examples of bidirectional three-phase interleaved converter topologies 603a, 603b, and 603c (bidirectional three-phase interleaved converter topologies 603) for various three-phase interleaved converters 103. Since the topologies include resonant circuits on both primary and secondary sides of the transformer core, the three-phase interleaved converters 103 that use these topologies can be considered bidirectional three-phase interleaved converters 103. While the left side can be referred to as the primary side for the purpose of clarity, either side of the bidirectional three-phase interleaved converter topologies 603 can be considered primary, and either side can be considered a secondary.

The bidirectional three-phase interleaved converter topologies 603 can include series integrated resonant inductors and transformer windings on both sides of the transformer. In other words, in each of the bidirectional three-phase interleaved converter topologies 603, $Trp_1$ and $Lr_1$ can be formed as a single integrated component. This is possible because these topologies are designed with $Trp_1$ and $Lr_1$ in series. The series relationship between these components allows leakage inductance of phase one of the transformer to be dominated and absorbed into the system as resonant inductor $Lr_1$. Likewise, in each of the bidirectional three-phase interleaved converter topologies 603, $Trp_2$ and $Lr_2$ can be formed as a single integrated component. $Trp_3$ and $Lr_3$ can also be formed as a single integrated component in each of the bidirectional three-phase interleaved converter topologies 603.

The bidirectional three-phase interleaved converter topology 603a shows a delta primary configuration with a first phase leg circuit segment that includes $Trp_1$, $Lr_1$, and $Cr_1$ in series, a second phase leg circuit segment that includes $Trp_2$, $Lr_2$, and $Cr_2$ in series, and a third phase leg circuit segment that includes $Trp_3$, $Lr_3$, and $Cr_3$ in series. The bidirectional three-phase interleaved converter topology 603a can be described as having a delta-connected primary with each phase leg circuit segment of the delta arrangement including a primary transformer winding, resonant inductor, and resonant capacitor in series. The bidirectional three-phase interleaved converter topology 603a can be described as having a delta secondary topology (or mixed delta-wye topology). A first phase leg circuit segment of the delta configuration includes $Lr_1$ and $Trp_1$ in series as a magnetically integrated component, a second phase leg circuit segment of the delta configuration includes $Lr_2$ and $Trp_2$ in series as a magnetically integrated component, a third phase leg circuit segment of the delta configuration includes $Lr_3$ and $Trp_3$ in series as a magnetically integrated component. The resonant capacitors $Cr_1$, $Cr_2$, and $Cr_3$, are arranged in a wye, each connecting from one of the three nodes of the delta to a half bridge or full bridge circuit.

The bidirectional three-phase interleaved converter topology 603b shows a delta primary configuration with a first phase leg circuit segment that includes $Trp_1$, $Lr_1$, and $Cr_1$ in series, a second phase leg circuit segment that includes $Trp_2$, $Lr_2$, and $Cr_2$ in series, and a third phase leg circuit segment that includes $Trp_3$, $Lr_3$, and $Cr_3$ in series. The bidirectional three-phase interleaved converter topology 603b can be described as having a delta-connected primary with each phase leg circuit segment of the delta arrangement including a primary transformer winding, resonant inductor, and resonant capacitor in series. The bidirectional three-phase interleaved converter topology 603b can be described as having a delta secondary configuration with a first phase leg circuit segment that includes $Trs_1$, $Lr_1$, and $Cr_1$ in series, a second phase leg circuit segment that includes $Trs_2$, $Lr_2$, and $Cr_2$ in series, and a third phase leg circuit segment that includes $Trs_3$, $Lr_3$, and $Cr_3$ in series. The bidirectional three-phase interleaved converter topology 603b can be described as having a secondary that matches or mirrors the primary. The topology can be referred to as a symmetrical topology.

The bidirectional three-phase interleaved converter topology 603c can be described as having a delta primary topology (or mixed delta-wye topology). A first phase leg circuit segment of the delta configuration includes $Lr_1$ and $Trp_1$ in series as a magnetically integrated component, a second phase leg circuit segment of the delta configuration includes $Lr_2$ and $Trp_2$ in series as a magnetically integrated component, a third phase leg circuit segment of the delta configuration includes $Lr_3$ and $Trp_3$ in series as a magnetically integrated component. Each of the resonant capacitors $Cr_1$, $Cr_2$, and $Cr_3$, are arranged in a wye connecting from corresponding ones of the three nodes of the delta, and to a half bridge or full bridge circuit. The bidirectional three-phase interleaved converter topology 603d can be described as having a delta secondary topology that mirrors its primary topology.

Figure 7:
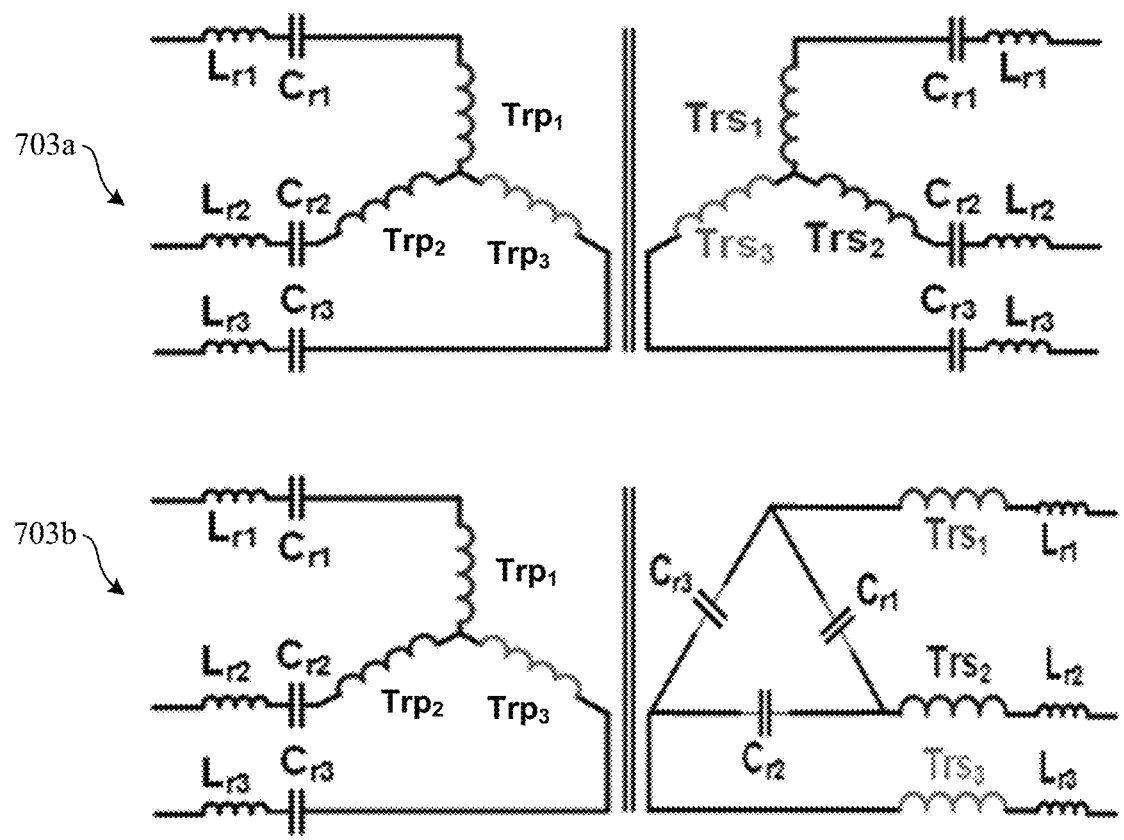
FIG. 7 shows additional examples of bidirectional three-phase interleaved topologies, according to various embodiments described herein.

FIG. 7 shows examples of bidirectional three-phase interleaved converter topologies 703a and 703b (bidirectional three-phase interleaved converter topologies 703) for various three-phase interleaved converters 103. Since the topologies include resonant circuits on both primary and secondary sides of the transformer core, the three-phase interleaved converters 103 that use these topologies can be considered bidirectional three-phase interleaved converters 103. While the left side can be referred to as the primary side for the purpose of clarity, either side of the bidirectional three-phase interleaved converter topologies 603 can be considered primary, and either side can be considered a secondary.

The bidirectional three-phase interleaved converter topology 703a can be described as having a wye primary topology with a first phase leg circuit segment that includes $Trp_1$, $Lr_1$, and $Cr_1$ in series, a second phase leg circuit segment that includes $Trp_2$, $Lr_2$, and $Cr_2$ in series, and a third phase leg circuit segment that includes $Trp_3$, $Lr_3$, and $Cr_3$ in series. The three-phase interleaved converter topology 212b can be described as having a wye-connected primary with each phase leg circuit segment in the wye arrangement including a primary transformer winding, resonant inductor, and resonant capacitor in series. The bidirectional three-phase interleaved converter topology 703a can be described as having a wye secondary topology that mirrors its primary side.

The bidirectional three-phase interleaved converter topology 703b can be described as having a wye primary topology with a first phase leg circuit segment that includes $Trp_1$, $Lr_1$, and $Cr_1$ in series, a second phase leg circuit segment that includes $Trp_2$, $Lr_2$, and $Cr_2$ in series, and a third phase leg circuit segment that includes $Trp_3$, $Lr_3$, and $Cr_3$ in series. The three-phase interleaved converter topology 212b can be described as having a wye-connected primary with each phase leg circuit segment in the wye arrangement including a primary transformer winding, resonant inductor, and resonant capacitor in series.

The bidirectional three-phase interleaved converter topology 703b can be described as having a wye topology (or mixed wye-delta topology). A first phase leg circuit segment of the wye configuration includes $Lr_1$ and $Trp_1$ in series as a magnetically integrated component, a second phase leg circuit segment of the wye configuration includes $Lr_2$ and $Trp_2$ in series as a magnetically integrated component, a third phase leg circuit segment of the wye configuration includes $Lr_3$ and $Trp_3$ in series as a magnetically integrated component. The resonant capacitors $Cr_1$, $Cr_2$, and $Cr_3$, are arranged in a delta at the center of the wye, with each phase leg circuit segment connecting from one of the three nodes of the delta to a half bridge or full bridge circuit. Each phase leg circuit segment can include a transformer winding and resonant inductor as a magnetically integrated component.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A three-phase interleaved converter, comprising:
   a primary side circuit of the three-phase interleaved converter comprising three phase leg circuit segments connected in a delta configuration or a wye configuration, a respective one of the phase leg circuit segments comprising an integrated winding component that provides a transformer primary winding and a resonant inductance in series;
   a secondary side circuit of the three-phase interleaved converter comprising three delta-connected secondary windings; and
   a transformer core comprising a plurality of core winding legs, wherein the integrated winding component is looped around at least one of the plurality of core winding legs, wherein the transformer core comprises six core winding legs, and a respective phase of the three-phase interleaved converter that uses a corresponding set of two core winding legs.

2. The three-phase interleaved converter of claim 1, wherein a respective secondary winding for the respective phase is looped around one of the two core winding legs for the respective phase, and at least a portion of the integrated winding component for the respective phase is looped around both of the two core winding legs for the respective phase.

3. The three-phase interleaved converter of claim 1, wherein the respective one of the phase leg circuit segments comprises the integrated winding component and a resonant capacitor in series.

4. The three-phase interleaved converter of claim 1, wherein the primary side circuit comprises three phase leg circuit segments connected in the delta configuration, and a respective one of three nodes of the delta configuration is connected to a respective half bridge circuit through a resonant capacitor.

5. The three-phase interleaved converter of claim 1, wherein the primary side circuit comprises three phase leg circuit segments connected in the wye configuration, wherein the respective one of the phase leg circuit segments extends from a delta-connected set of three resonant capacitors.

6. The three-phase interleaved converter of claim 1, wherein the transformer core comprises a plurality of edge core legs that provide flux paths that are outside of the plurality of core winding legs.

7. A three-phase interleaved converter, comprising:
a transformer core comprising a plurality of core winding legs, wherein the transformer core comprises a plurality of edge core legs that provide flux paths that are outside of the plurality of core winding legs;
a plurality of transformers integrated into the transformer core, wherein a count of the plurality of transformers is a multiple of three; and
a primary side circuit comprising a plurality of circuit segments corresponding to phases of the three-phase interleaved converter, a respective one of the plurality of circuit segments comprising an integrated winding component that provides a transformer primary winding and a resonant inductor connected in series.

8. The three-phase interleaved converter of claim 7, wherein a respective phase leg of the three-phase interleaved converter uses multiple transformers.

9. The three-phase interleaved converter of claim 7, wherein a respective phase of the three-phase interleaved converter uses a set of two core winding legs of the plurality of core winding legs.

10. The three-phase interleaved converter of claim 9, wherein the integrated winding component provides a transformer component using a first portion of the integrated winding component that loops around a first one of the set of two core winding legs along with a secondary winding for the respective phase, and the integrated winding component provides the resonant inductor using a second portion of the integrated winding component that loops around a second one of the set of two core winding legs.

11. The three-phase interleaved converter of claim 7, wherein the respective one of the plurality of circuit segments comprises the integrated winding component and a resonant capacitor in series.

12. The three-phase interleaved converter of claim 7, wherein the primary side circuit comprises three phase leg circuit segments connected in a delta configuration, and a respective one of three nodes of the delta configuration are connected to a respective half bridge circuit through a resonant capacitor.

13. The three-phase interleaved converter of claim 7, wherein the primary side circuit comprises three circuit segments connected in a wye configuration, wherein a respective one of phase leg circuit segments extends from a delta-connected set of three resonant capacitors.

14. The three-phase interleaved converter of claim 7, wherein a secondary side circuit mirrors a circuit topology of the primary side circuit, and the three-phase interleaved converter is a bidirectional three-phase interleaved converter.

15. A bidirectional three-phase interleaved converter, comprising:
a primary side circuit comprising a first plurality of circuit segments corresponding to phases of the bidirectional three-phase interleaved converter, a particular one of the first plurality of circuit segments comprising a first integrated winding component that provides a transformer primary winding and a primary-side resonant inductor connected in series; and
a secondary side circuit comprising a second plurality of circuit segments corresponding to the phases of the bidirectional three-phase interleaved converter, a particular one of the second plurality of circuit segments comprising a second integrated winding component that provides a transformer secondary winding and a secondary-side resonant inductor connected in series, where the secondary side circuit matches a circuit topology of the primary side circuit.

16. The bidirectional three-phase interleaved converter of claim 15, wherein the first plurality of circuit segments is connected in a delta.

17. The bidirectional three-phase interleaved converter of claim 16, wherein a respective one of the first plurality of circuit segments comprises the first integrated winding component connected in series with a resonant capacitor.

18. The bidirectional three-phase interleaved converter of claim 15, comprising a transformer core comprising a plurality of core winding legs.

19. The bidirectional three-phase interleaved converter of claim 18, wherein a respective phase of the three-phase interleaved converter uses a set of two core winding legs of the plurality of core winding legs.

20. The bidirectional three-phase interleaved converter of claim 18, wherein the transformer core comprises a plurality of edge core legs that provide flux paths that are outside of the plurality of core winding legs.

* * * * *